US010025956B2

(12) United States Patent
Basak et al.

(10) Patent No.: US 10,025,956 B2
(45) Date of Patent: Jul. 17, 2018

(54) TECHNIQUES TO COMPRESS CRYPTOGRAPHIC METADATA FOR MEMORY ENCRYPTION

(71) Applicant: Intel Corporation, Santa Clara, CA (US)

(72) Inventors: Abhishek Basak, Hillsboro, OR (US); Siddhartha Chhabra, Hillsboro, OR (US); Jungju Oh, San Jose, CA (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 14/975,588

(22) Filed: Dec. 18, 2015

(65) Prior Publication Data

US 2017/0177505 A1 Jun. 22, 2017

(51) Int. Cl.
*G06F 21/79* (2013.01)
*G06F 3/06* (2006.01)
(Continued)

(52) U.S. Cl.
CPC ........... *G06F 21/79* (2013.01); *G06F 3/0623* (2013.01); *G06F 3/0661* (2013.01); *G06F 3/0673* (2013.01); *G06F 12/0891* (2013.01); *G06F 12/124* (2013.01); *G06F 12/1408* (2013.01); *H04L 9/0637* (2013.01);
(Continued)

(58) Field of Classification Search
CPC ....................................................... G06F 21/79
See application file for complete search history.

(56) References Cited

U.S. PATENT DOCUMENTS 3,311,888 A * 3/1967 Hanan ............... G06F 17/30949
707/E17.036
4,333,149 A * 6/1982 Taylor ................. G01R 31/3662
320/149

(Continued)

FOREIGN PATENT DOCUMENTS

WO 2001039417 A2 5/2001
WO 2014055136 A1 4/2014

OTHER PUBLICATIONS

International Search Report and Written Opinion for PCT Patent Application No. PCT/US2016/062467, dated Mar. 13, 2017, 10 pages.

*Primary Examiner* — Bradley Holder
(74) *Attorney, Agent, or Firm* — Compass IP Law PC

(57) ABSTRACT

Examples include techniques for compressing counter values included in cryptographic metadata. In some examples, a cache line to fill a cache included in on-die processor memory may be received. The cache arranged to store cryptographic metadata. The cache line includes a counter value generated by a counter. The counter value to serve as version information for a memory encryption scheme to write a data cache line to a memory location of an off-die memory. In some examples, the counter value is compressed based on whether the counter value includes a pattern that matches a given pattern and is then stored to the cache. In some examples, a compression aware and last recently used (LRU) scheme is used to determine whether to evict cryptographic metadata from the cache.

26 Claims, 11 Drawing Sheets

_900_

RECEIVE A CACHE LINE TO FILL A CACHE INCLUDED IN ON-DIE PROCESSOR MEMORY, THE CACHE ARRANGED TO STORE CRYPTOGRAPHIC METADATA, THE CACHE LINE INCLUDING A COUNTER VALUE GENERATED BY COUNTER, THE COUNTER VALUE TO SERVE AS VERSION INFORMATION DURING A WRITE TO A MEMORY LOCATION OF AN OFF-DIE MEMORY
_902_

COMPRESS THE COUNTER VALUE BASED ON WHETHER THE COUNTER VALUE INCLUDES A PATTERN THAT MATCHES A GIVEN PATTERN INCLUDED IN A DICTIONARY MAINTAINED IN THE CACHE AND/OR BASED ON WHETHER THE COUNTER VALUE INCLUDES A SPATIAL RUN OF REPEATED CHARACTERS OR CHARACTER PATTERNS
_904_

STORE THE COMPRESSED COUNTER VALUE TO THE CACHE
_906_

(51) Int. Cl.
*G06F 12/0891* (2016.01)
*G06F 12/123* (2016.01)
*G06F 12/14* (2006.01)
*H04L 9/06* (2006.01)

(52) U.S. Cl.
CPC ........... *G06F 2212/1052* (2013.01); *G06F 2212/401* (2013.01); *G06F 2212/402* (2013.01); *G06F 2212/60* (2013.01); *G06F 2212/69* (2013.01)

(56) References Cited

U.S. PATENT DOCUMENTS

| | | | | |
|---|---|---|---|---|
| 5,033,013 | A * | 7/1991 | Kato | A43B 1/0054 235/105 |
| 5,912,905 | A * | 6/1999 | Sakai | H03M 13/151 714/757 |
| 6,175,896 | B1 * | 1/2001 | Bui | G06F 12/0802 709/247 |
| 6,502,108 | B1 * | 12/2002 | Day | G06F 11/0751 |
| 6,523,102 | B1 * | 2/2003 | Dye | G06F 12/023 709/247 |
| 8,447,948 | B1 * | 5/2013 | Erdogan | G06F 12/0871 711/129 |
| 8,587,600 | B1 * | 11/2013 | Tischler | G09G 5/363 345/537 |
| 9,361,228 | B2 * | 6/2016 | Turner | G06F 3/0608 |
| 2003/0135694 | A1 * | 7/2003 | Naffziger | G06F 12/0802 711/118 |
| 2004/0093479 | A1 * | 5/2004 | Rannchandran | G06F 9/30014 712/210 |
| 2004/0255209 | A1 * | 12/2004 | Gross | G11C 29/76 714/710 |
| 2005/0071562 | A1 * | 3/2005 | Adl-Tabatabai | G06F 12/0886 711/118 |
| 2005/0071566 | A1 * | 3/2005 | Adl-Tabatabai | G06F 12/0886 711/128 |
| 2005/0114601 | A1 * | 5/2005 | Ramakrishnan | G06F 12/0802 711/118 |
| 2005/0125633 | A1 | 6/2005 | Topham | |
| 2005/0144388 | A1 * | 6/2005 | Newburn | G06F 12/0802 711/118 |
| 2005/0160234 | A1 * | 7/2005 | Newburn | G06F 12/0802 711/144 |
| 2005/0268046 | A1 * | 12/2005 | Heil | G06F 12/0862 711/137 |
| 2006/0047916 | A1 * | 3/2006 | Ying | G06F 12/0802 711/144 |
| 2006/0101206 | A1 * | 5/2006 | Wood | G06F 12/0802 711/122 |
| 2008/0117679 | A1 | 5/2008 | Srinivasan et al. | |
| 2009/0077109 | A1 | 3/2009 | Paris | |
| 2015/0100819 | A1 * | 4/2015 | Fedorov | G06F 11/1088 714/6.12 |
| 2015/0193353 | A1 * | 7/2015 | Habermann | G06F 12/0897 711/122 |
| 2015/0347310 | A1 * | 12/2015 | Ish | G06F 3/0608 711/3 |

* cited by examiner

Pattern Generation 500

Galois Field Shift Register 510

Output Counter Values 520

```
0 0 0 1 0 1 1 1 0 1 0 1 0 1 1 1   (20th) State
0 0 0 1 1 1 0 1 1 1 0 0 1 0 0 1
0 0 0 0 1 1 1 0 1 1 1 0 1 0 1 1
0 0 0 1 0 1 1 1 0 1 1 1 0 1 1 1
0 0 0 1 1 0 1 1 1 0 1 1 1 0 0 1
0 0 0 1 1 1 0 1 1 1 0 1 1 1 1 0
0 0 0 0 1 1 1 0 1 1 1 0 1 1 1 1
0 0 0 1 0 1 1 1 0 1 1 1 0 1 0 1
0 0 0 1 1 0 1 1 1 0 1 1 1 0 0 0
0 0 0 0 1 1 0 1 1 1 0 1 1 1 0 0
0 0 0 0 0 1 1 0 1 1 1 0 1 1 1 0
0 0 0 0 0 1 1 0 1 1 1 0 1 1 1 1
0 0 0 1 0 0 0 1 1 0 1 1 1 0 0 1   (33rd) State
```

*Storage Scheme 800*

Tag Look Up 810

[Tag1][Valid[Dirty][Compressed Len][Tag2][Valid]Dirty][Tag3][Valid][Dirty][Compressed Len]

RECEIVE A CACHE LINE TO FILL A CACHE INCLUDED IN ON-DIE PROCESSOR MEMORY, THE CACHE ARRANGED TO STORE CRYPTOGRAPHIC METADATA, THE CACHE LINE INCLUDING A COUNTER VALUE GENERATED BY COUNTER, THE COUNTER VALUE TO SERVE AS VERSION INFORMATION DURING A WRITE TO A MEMORY LOCATION OF AN OFF-DIE MEMORY
902

COMPRESS THE COUNTER VALUE BASED ON WHETHER THE COUNTER VALUE INCLUDES A PATTERN THAT MATCHES A GIVEN PATTERN INCLUDED IN A DICTIONARY MAINTAINED IN THE CACHE AND/OR BASED ON WHETHER THE COUNTER VALUE INCLUDES A SPATIAL RUN OF REPEATED CHARACTERS OR CHARACTER PATTERNS
904

STORE THE COMPRESSED COUNTER VALUE TO THE CACHE
906

FIG. 9

Storage Medium 1000

*Computer Executable Instructions for 900*

*FIG. 10*

TECHNIQUES TO COMPRESS CRYPTOGRAPHIC METADATA FOR MEMORY ENCRYPTION

TECHNICAL FIELD

Examples described herein are generally related to techniques for compression of metadata.

BACKGROUND

Modern processors are designed to protect sensitive data in memory from both hardware and software attacks. Some processors provide cryptographic mechanisms for encryption, integrity, and replay protection. Memory encryption protects the confidentiality of memory-resident data (e.g., data stored to off-die memory). On the other hand, integrity protection prevents an attacker from causing hidden modifications to the ciphertext (i.e., encrypted data, as opposed to plaintext which is unencrypted data) in memory, and replay protection eliminates undetected temporal substitution of the ciphertext. In the absence of such protections, an attacker with physical access to the system can record snapshots of data cache lines from the processor and replay them at a later point in time.

Memory encryption is primarily designed to protect against passive attacks where an attacker tries to silently observe the data cache lines as the data cache lines move on and off the processor die. Some processors include an encryption module that encrypts sensitive data before the data is stored into a protected region of the memory. On a memory read to the protected region, the data cache line is decrypted before being fed into the processor.

BRIEF DESCRIPTION OF THE DRAWINGS

FIG. 8 illustrates an example storage scheme.
FIG. 9 illustrates an example of a logic flow.
FIG. 10 illustrates an example of a storage medium.

DETAILED DESCRIPTION

Figure 1:
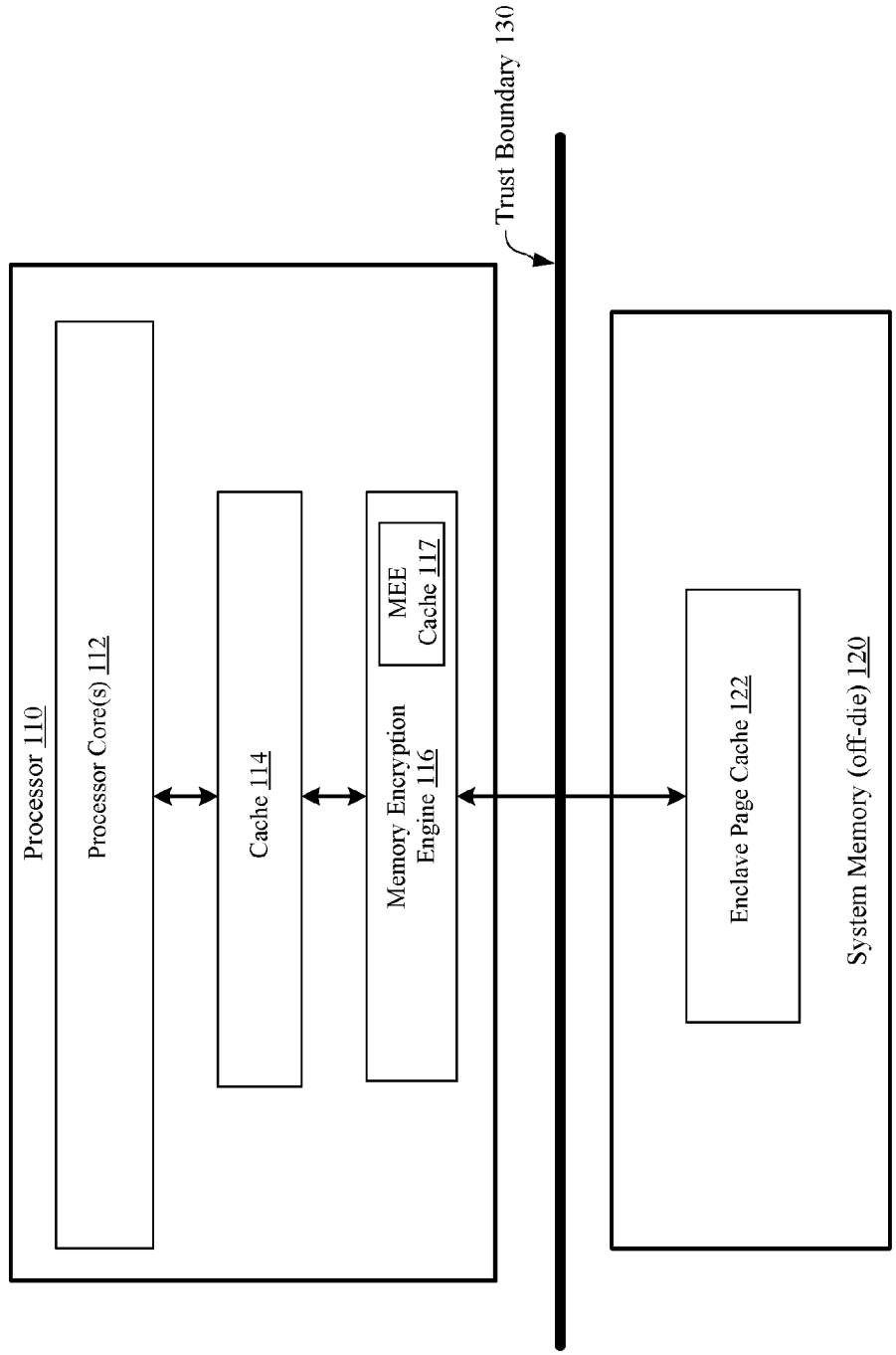
FIG. 1 illustrates an example first system.

The encryption and decryption algorithms can be chosen based on the security level required by a user. One possible choice of encryption is counter mode encryption. In counter mode encryption, the cryptographic task of encrypting/decrypting a data cache line is decoupled from the data itself. An example of counter mode encryption uses the $AES_k$ encryption algorithm.

In some examples, to ensure the security of counter mode encryption, a seed used for this type of encryption needs to be unique both spatially and temporarily. Spatial uniqueness can be achieved by using the address of the data cache line as a component of the seed. Temporal uniqueness, on the other hand, can be achieved by associating a per-line counter value with the data line subject to encryption. The counter value may be incremented each time the associated data cache line is written back to off-die memory. The counter value may also act as a version of the data cache line.

Some processors may implement a counter tree structure, which stores a version (counter value) for each protected data cache line at a lowest level of the tree. The upper levels of the tree store a hierarchy of counters. Most of the counter tree structure is stored in system or main memory that is off-die in relation to the processor die except the top level counters which are stored in on-die memory for the processor (e.g., in a relatively small cache). By implementing a chain of verification operations using this counter tree structure an area of system memory sometimes referred to as enclave page cache (EPC) may be protected from replay attacks. For example, a write to a protected data cache line modifies a corresponding tree node at each level of the counter tree. When the protected data cache line is read, the processor verifies the value of the corresponding tree node at each level of the counter tree to authenticate the read result.

A type of memory encryption that utilizes counter mode encryption having a counter tree structure has been incorporated in a technology developed by Intel® Corporation for Intel processors. The technology is known as Intel's Trusted Execution Environment (TEE), Software Guard Extensions (SGX). In some examples, when employed with applications executed on processors within Intel's TEE, SGX enables applications to protect confidentiality of enclave secrets by ensuring that enclave secrets are stored encrypted when stored in off-die system, main or platform memory. Applications operating within Intel's TEE may be considered as being in an enclave operation. In order to provide complete protection from hardware attacks during enclave operations, SGX needs to provide integrity protection and replay protection. In order to achieve these integrity and replay protections, SGX utilizes a memory encryption engine (MEE). The MEE is designed to provide cryptographic mechanisms for encryption, integrity, and replay protection.

In some examples, an SGX architecture may include each data cache line of 64 bytes (B) having 56 bit version counter values and 8 bit message authentication codes (MACs) which are stored striped in 8 bit chunks. The 56 bit version counter values and the 8 bit MACs may be collectively referred to as cryptographic metadata. This cryptographic metadata may provide integrity and replay protections to data cache lines during enclave operations. In some examples, 8 of these 64 bit version counter values/MACs may be part of a 64B data cache line (indexing contiguous data-lines). The cryptographic metadata may be stored in an un-encrypted form in protected on-die memory for a processor incorporating the SGX architecture. A separate tree of a counter tree structure (distributed over cache levels L0-L3) protects the integrity of the version counter values for the data cache lines, with each level compressed to ⅛th of the lower level till the highest level, last level cache or L3, results in a total of 4 kilobytes (KB) being stored in on-die memory for the processor. Thus, a root of trust or trust boundary is established at L3 and this root of trust prevents replay of stale data cache lines and associated MAC. Prevention is afforded by detecting integrity errors at some point in the counter tree hierarchy. Data associated with this counter tree structure may also be referred to as cryptographic metadata from a point of view of information required for security verification.

According to some examples, for a processor incorporating the SGX architecture, an MEE at the processor may be arranged to have its own cache. This MEE cache may store recently accessed cryptographic metadata for corresponding data cache lines to save memory/off-die bandwidth and enhance enclave operation performance. However, the MEE cache may be relatively small and applications during enclave operations may have to transfer cryptographic metadata to and from off-die memory during read misses and associated write-backs constantly or at least at high levels. High levels of transferring cryptographic metadata during read misses and associated write-backs may lead to significant off-die bandwidth requirements as wells as corresponding latency issues. Increased power consumption may also result. Also, usage scenarios for server architectures having potentially multiple application threads performing enclave operations at a same time may further worsen bandwidth, latency and power issues.

FIG. 1 illustrates an example system 100. In some examples, as shown in FIG. 1, system 100 includes a processor 110 including one or more processor core(s) 112, a cache 114 and a memory encryption engine (MEE) 116. System 100 also includes a system memory 120 that is off-die or off-chip in relation to processor 110. In some examples, as described more below, MEE 116 may include logic and/or features to perform encryption, decryption and authentication of data cache lines moving in and out of a protected region of system memory 120 that is shown in FIG. 1 as enclave page cache (EPC) 122. A trusted boundary 130 shown in FIG. 1 indicates a demarcation between trusted enclave operations for memory encryption occurring on-chip or on-die at processor 110 and enclave operations that may occur off-chip or off-die at system memory 120.

MEE 116 includes an MEE cache 117 to store recently accessed cryptographic metadata for corresponding data cache lines to reduce a need to for MEE 116 to access EPC 122 during enclave operations. As described more below, MEE 116 may include logic and/or features to compress at least some cryptographic metadata stored to MEE cache 117 in order to increase an effective memory capacity of MEE cache 117. For example, one or more compression schemes may be implemented to compress counter values serving as version information during a write to a memory location of system memory 120, e.g., included in EPC 122.

According to some examples, processor 110 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device or platform. In some examples, processor 110 may be included in a system on a chip (SOC).

In some examples, core(s) 112 of processor 110 may be arranged to execute instructions associated with applications performing enclave operations within system 100. Core(s) 112 may include, but are not limited to, pre-fetch logic to fetch instructions, decode logic to decode the instructions, execution logic to execute instructions and the like. Processor 110 also includes a cache 114 to cache instructions and/or data. Cache 114 includes, but is not limited to, level one (L1), level two (L2), and a last level cache (LLC) or level three (L3) cache, or any other configuration of the cache memory for use by processor 110.

In some examples, MEE cache 117 and cache 114 may include volatile types of memory including, but not limited to, random-access memory (RAM), Dynamic RAM (DRAM), double data rate synchronous dynamic RAM (DDR SDRAM), static random-access memory (SRAM), Thyristor RAM (TRAM) or zero-capacitor RAM (ZRAM). However, examples are not limited in this manner, and in some instances, at least some levels of cache 114 may include non-volatile types of memory, including, but not limited to, 3-dimensional cross-point memory, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, electrically erasable programmable read-only memory (EEPROM), phase change memory, memristors or spin transfer torque—magnetoresistive random access memory (STT-MRAM).

According to some examples, system memory 120 may include volatile types of memory including, but not limited to, RAM, DRAM, DDR SDRAM, SRAM, TRAM or ZRAM. One example of DRAM, or some variant such as SDRAM. System memory as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

However, examples are not limited in this manner, and in some instances, system memory 120 may include non-volatile types of memory, whose state is determinate even if power is interrupted to the device. In one embodiment, the non-volatile memory device is a block addressable memory device, such as NAND or NOR technologies. Thus, a memory device can also include a future generation non-volatile devices, such as a 3-dimensional cross-point memory device, or other byte addressable non-volatile memory devices. In some examples, the memory device can be or include memory devices that use chalcogenide phase change material (e.g., chalcogenide glass), multi-threshold level NAND flash memory, NOR flash memory, single or multi-level Phase Change Memory (PCM), a resistive memory, nanowire memory, FeTRAM, MRAM that incorporates memristor technology, STT-MRAM, or a combination of any of the above, or other memory.

Figure 2:
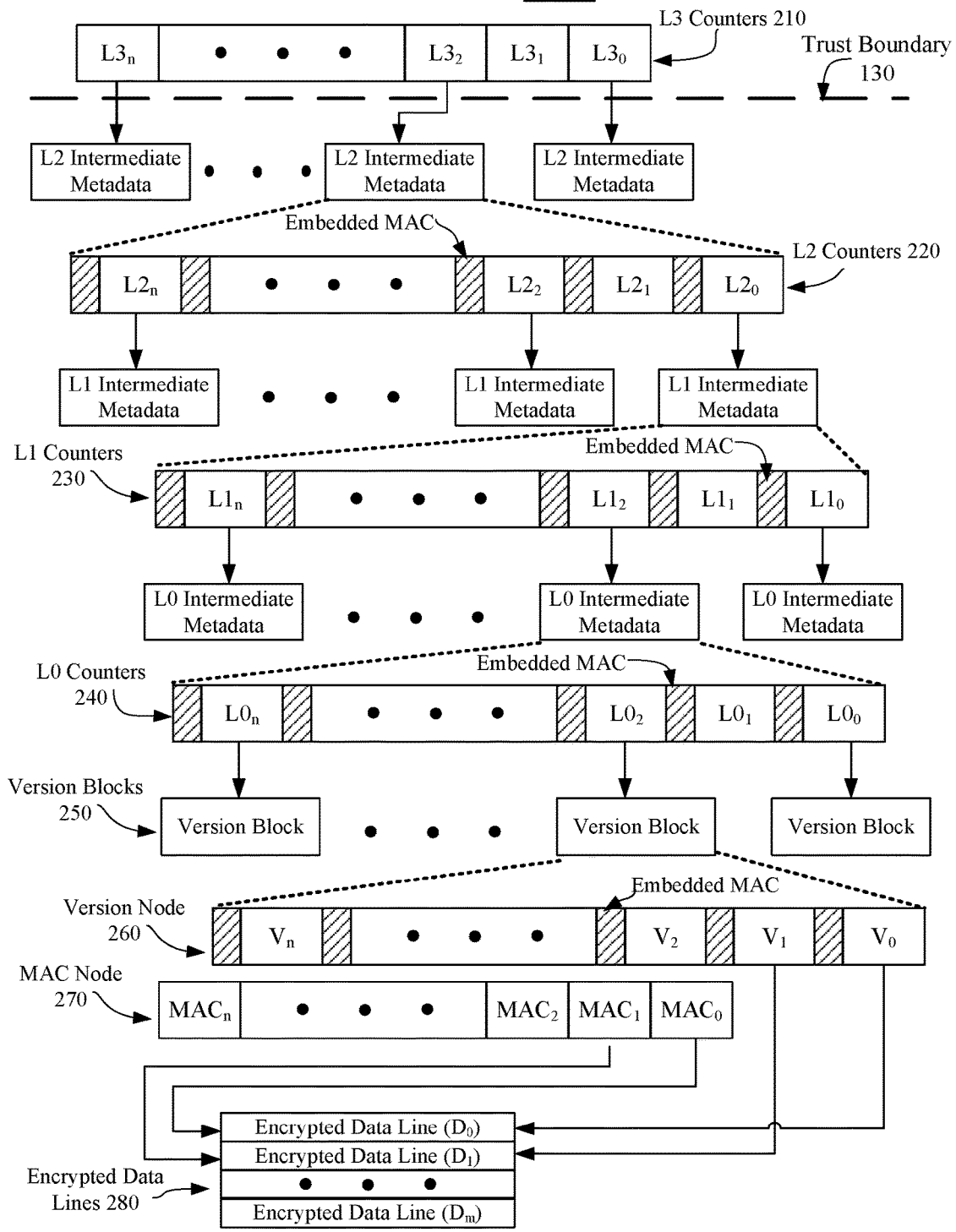
FIG. 2 illustrates an example structure.

FIG. 2 illustrates an example structure 200. In some examples, structure 200 may represent a counter tree structure for integrity and replay protections as part of counter mode encryption. Structure 200 for counter mode encryption described herein represents an example, alternative mechanisms of counter mode encryption are also contemplated. In alternative mechanisms there may be more or fewer levels in the counter tree structure than what is shown in FIG. 2.

In some examples, as shown in FIG. 2, structure 200 includes a hierarchy of levels of tree nodes. The top (root) level includes a sequence of on-die counters (i.e., L3 counters 210), which are stored in an internal storage of the processor die (e.g., LLC or L3 cache). The internal storage may include, but is not limited to, on-die SRAM, register files, and any other suitable memory in the processor die. As the L3 counters 210 are on the processor die, their contents are trusted and secure from passive and active attacks. However, the trusted boundary (shown as a dashed-line 135) ends at the L3 counters 210. In some examples, lower levels of the counter tree for structure 200 lie outside of the processor die (e.g., in system memory 120 of FIG. 1).

According to some examples, each L3 counter 210 may be linked to a block of L2 intermediate metadata, which contains a sequence of L2 counters 220. Each L2 counter 220 may be linked to a block of L1 intermediate metadata, which contains a sequence of L1 counters 230. Each L1 counter 230 may be linked to a block of L0 intermediate metadata, which contains a sequence of L0 counters 240. Each L0 counter 240 is linked to a version block 250, which contains a sequence of version nodes (represented by "V") 260. For these examples, each version node 260 may be associated with an encrypted data line from among encrypted data lines 280 in a protected region of system memory 120 (e.g., EPC 122). For example, among encrypted data lines $D_0$-$D_m$, where "m" is any positive whole integer>1.

In some examples, the content of a version node 260 is the version of an associated data cache line, which provides a temporal component of the encryption seed in the counter mode encryption. Lower-level counters (including L2, L1 and L0 counters and the version nodes 260) may be stored off-die in relation to the processor die. The lower-level counters being off-die may be susceptible to attacks. In order to protect from attacks, each counter and each version node may be encoded with an embedded Message Authentication Code (MAC) (shown as the blocks with hatched lines) to ensure integrity.

According to some examples, each embedded MAC may be computed over the line in which they are embedded, using a corresponding counter from the next higher level as input. In the example structure 200 of FIG. 2, the embedded MAC for the version block 250 associated with $L0_2$ (shown in FIG. 2 as the middle version block) is computed using the values of $V_0$-$V_n$, where "n" is any positive whole integer>2, and its corresponding L0 counter ($L0_2$). The value of this embedded MAC may be stored striped in the line of the version blocks 250 (shown as striped boxes in FIG. 2). The embedded MAC for each line of L0, L1 and L2 may be computed similarly. L3 counters may not use embedded MACs because the contents of L3counters are within the trusted boundary 135.

In some examples, an entire counter tree similar to structure 200 may be built over a protected memory region, starting from the versions up to the L3 counters and may provide replay protection to data cache lines in the protected memory region. For these examples, a process of replay protection may include logic and/or features at a processor performing a read operation or a write operation to a data cache line, an MEE included in the processor (e.g., MEE 116) may load a branch of the counter tree that contain tree nodes (also referred to as branch nodes) identified by the address of the data cache line. The process of loading the tree nodes along a branch and verifying the authenticity of their values is herein referred to as a tree walk. Tree walks proceed from the bottom level of the counter tree (i.e., the version nodes 260) to the root nodes (i.e., the L3counters). Authenticity of the tree node values may need to be verified because a major portion of the tree structure is resident in off-die system or main memory and may be susceptible to attacks. In case of a write, the tree walk may be performed to verify authenticity of the branch nodes values and update those values. In case of a read, the tree walk may also be performed to verify the authenticity of the branch nodes values but without updating those values. According to some examples, the MEE may contain logic and/or features such as finite state machine circuitry that implements the tree walk.

In some examples, each encrypted data line 280 may be encoded with a MAC node 270 containing a MAC computed from the content of the data line 280. Each time the data cache line is written back to the protected region of system memory, the MEE may update this MAC to reflect the most recent data value stored in the protected region of system memory. When a data cache line is read from the protected region of system memory, the MEE may verify the value of its associated MAC node 270 to establish the integrity of the data cache line being read. The use of the MAC nodes 270 provides integrity protection against modification attacks on a memory-resident data cache line by use of a MAC for a data cache line being computed using the data cache line and the version.

According to some examples, when an application executed by a processor during an enclave operation performs a write operation to write back one of the encrypted data lines 280 into the protected memory region (e.g., when evicting a data cache line from an on-die last level or L3 cache to the protected region in the system memory), the MEE may identify the version node 260 and the L0, L1, L2 and L3 counters (210-240) associated with that data cache line. The MEE may increment the version of that data line in the identified version node 260 and then update the MAC 270 associated with the data cache line. In addition, the MEE may also update the identified L0, L1, L2 and L3 counters (210-240) of that data cache line, as well as the embedded MAC associated with the updated version and the counters. This update process proceeds from the bottom level of the counter tree up to the root level of L3 counters, which are stored securely in on-die memory for the processor and hence are protected against attacks. The counters at each level of the counter tree act as the versions for the next lower level ending with the version nodes 260 storing the versions for the data cache lines. Hence, on a write to a data cache line, all of the counters (including the version) and their associated embedded MACs along the branch identified by the data cache line's address are updated to reflect the version update.

In some examples, in order to ensure replay protection, each time a data cache line is loaded from the protected region it is verified for authenticity against the tree nodes up to the root of the counter tree. A mismatch at any level indicates a potential attack and raises a security exception, thereby possibly defeating the attack. For example, when an application executed by a processor during enclave operations initiates a read operation for one of the encrypted data lines 280, an MEE at the processor may identify the version and the L0, L1, L2 and L3 counters (210-240) of that data cache line. Read operations do not alter the values of the version and the L0, L1, L2 and L3 counters (210-240). Upon a read operation, the MEE verifies the MAC 270 associated with the data cache line. In addition, the MEE verifies the embedded MAC associated with each of the version, L0, L1, L2 and L3 counters (210-240). This verification process proceeds from the bottom level of the counter tree up to the secure root counter L3.

According to some examples, the tree nodes of structure 200 loaded in a tree walk may be cached locally in an MEE cache such as MEE cache for MEE 116. For these examples, the MEE cache stores the values of the tree nodes (including the version nodes and the embedded MACs) that have been verified by previous requests. This content may be referred to as cryptographic metadata and while stored to the MEE cache is considered as secure because it is located on the processor die. For read operations, a tree walk may be terminated when the first node along the branch of the tree walk is found in the MEE cache. For write operations, a tree walk is terminated when the first node along the branch of the tree walk is found in the MEE cache and that the cached tree node is in the modified state.

In some examples, to ensure that the counter tree returns correct counter values for all requests, on a write request the MEE may include logic and/or features to complete the update to all of the tree nodes along the write request's branch before any other request (read or write) sharing any of those tree nodes can proceed. As read requests do not alter the values of the counter tree, some of the read requests may be processed in parallel even though these read requests share one or more of the tree nodes in the counter tree.

Figure 3:
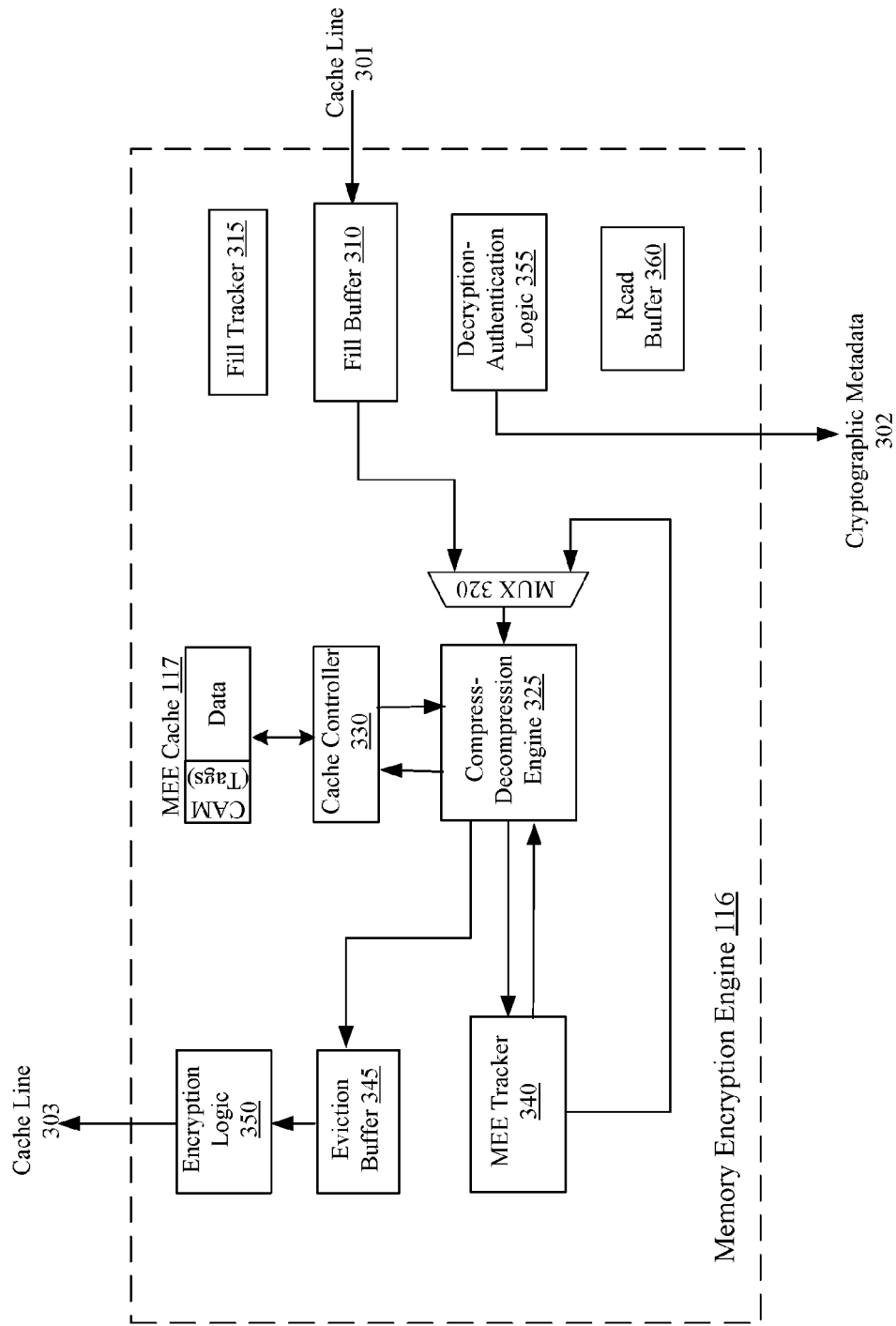
FIG. 3 illustrates an example second system.

FIG. 3 illustrates an example system 300. In some examples, as shown in FIG. 3, system 300 includes a cache line 301 being received at MEE 116. For these examples, cache line 301 may include cryptographic metadata that may include counter values generated by a linear-feedback shift register (LFSR). Counter values included in cryptographic metadata received via cache line 301 may serve as version information during writes to or read from a protected memory location of an off-die memory (e.g., EPC 122 or system memory 120). As described more below, compression-de-compression engine (CDE) 325 may include logic and/or features to implement one or more compression schemes to compress counter values such as counter values included in cache line 301 by encoding repeating data patterns and then storing compressed counter values to MEE cache 112.

According to some examples, the various components of MEE 116 shown in FIG. 3 include a fill buffer 310, a fill tracker 315, a multiplexor (MUX) 320, CDE 325, a cache controller 330, MEE cache 117, an MEE tracker 340, an eviction buffer 350, an encryption logic 350, a decryption-authentication logic 355 and a read buffer 360. For these examples, fill buff 310 may at least temporarily store received cryptographic metadata before compression of the counter values by CDE 325. MEE tracker 340 may track read or write requests sent to MEE 116 for decryption-authentication logic 355 to process via encryption, decryption and authentication of tree nodes for an example counter mode encryption scheme, e.g., using a tree structure such as structure 200 shown in FIG. 2. Cryptographic metadata 302 may be outputted by decryption authentication logic 355 responsive to received requests. Read buffer 360 may at least temporarily store information associated with read requests to be processed by decryption authentication logic 355.

In some examples, tracking information from MEE tracker 340 may be multiplexed with counter values forwarded from fill buffer 310 to be included with compressed counter values or other cryptographic information to be stored by cache controller 330 to MEE cache 117 following compression by CDE 325. As described more below, cache 117 may be arranged as an 8-way associative cache to protected regions of off-die system memory and may also include content addressable memory (CAM) to store tags to facilitate look up of data stored to MEE cache 117.

According to some examples, MEE encryption engine 116 may include logic and/or features such as a fill tracker 315 to monitor the filling of MEE cache 117 with cryptographic metadata. For these examples, MEE cache 117 may have a relatively small memory capacity of around 64 KB and an cache eviction scheme may be implemented to selectively evict data from MEE cache 117 based on whether or not that data has been compressed and based on what cryptographic metadata has been last recently used (LRU) by MEE 116. This cache eviction scheme is hereinafter referred to as a compression aware LRU cache eviction scheme. In some examples, eviction buffer 345 may at least temporarily store data selected for eviction from MEE cache 117. Encryption logic 350 may be capable of encrypting the evicted data before it goes off-die for possible storage to a protected region of system memory.

In some examples, logic and/or features of CDE 325 may implement the compression aware LRU cache eviction scheme by first keeping track of a length or size of each compressed counter value and utilizing the length or size as a factor in determining if the counter value is a candidate for replacement. The length or size is just a factor in that some uncompressed data for other types of cryptographic metadata such as MACs may negatively impact performance of MEE 116 if this type of uncompressed data was mostly evicted before compressed counter values. The negative impact may be due to MACs typically being accessed in every data read/write to protected memory. Continually replacing MACs could potentially increase misses and write-backs in cases of high access locality to memory locations at the protected off-die system memory.

Figure 4:
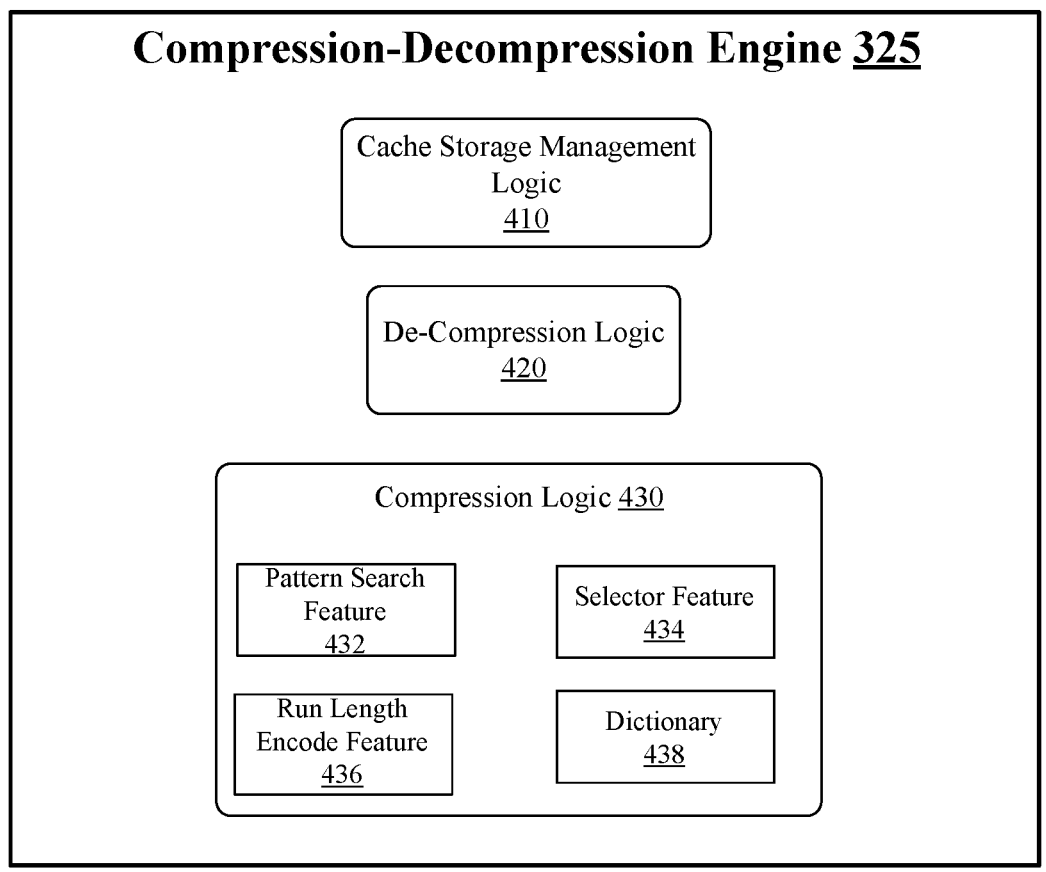
FIG. 4 illustrates an example block diagram for a compression-decompression engine.

FIG. 4 illustrates an example block diagram for compression-de-compression engine 325. Although CDE 325 shown in FIG. 4 has a limited number of elements in a certain topology, it may be appreciated that the CDE 325 may include more or less elements in alternate topologies as desired for a given implementation of a CDE arranged to operate in an MEE such as MEE 116 described in FIGS. 1 and 3.

In some examples, as shown in FIG. 4, CDE 325 includes a cache storage management logic 410, a de-compression logic 420 and a compression logic 430. In some examples, cache storage management logic 410, de-compression logic 420 or compression logic 430 may be types of logic, at least a portion of which is in hardware, to implement techniques for compressing cryptographic metadata. For example, compression logic 430 may include features such as a pattern search feature 432, a selector feature 434, a run length encode (RLE) feature 436 or a dictionary 438 to compress a counter value included in a received cache line. Cache storage management logic 410 may be capable of storing the compressed counter value to an MEE cache and implementing a cache replacement policy (e.g., compression aware LRU) to decide what data to evict from the MEE cache. De-compression logic 420 may be arranged to decompress counter values compressed by compression logic 430 in the event the compressed data is associated with a read or write request or is subject to a cache eviction.

Figure 5:
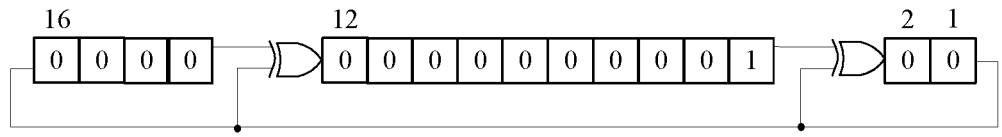
FIG. 5 illustrates an example pattern generation.

FIG. 5 illustrates an example pattern generation 500. In some examples, MEE cache 117 of MEE 116 may be arranged to store cryptographic metadata associated with Intel's TEE which is based on an SGX architecture providing cryptographic mechanisms for encryption, integrity, and replay protection for an application executing within the TEE. For these examples, an LFSR may be used to generate counter values to serve as version information during enclave operations of the application. Galois Field Shift Register (GFSR) 510 shown in FIG. 5 may be a type of LFSR used to generate these counter values. Examples are not limited to GFSR types of LFSRs, other types of LFSRs are contemplated.

According to some examples, GFSR 510 may generate binary digit counter values having temporal patterns. For example, GFSR 510 as shown in FIG. 5 may be a 16 bit GFSR with taps at the $2^{nd}$ and $12^{th}$ bits and may have a seed value of "0000000000000100". As an example, states outputted by GFSR 510 between the $22^{nd}$ and $31^{st}$ state transitions shows recurrence of the pattern "11101110" indicated in FIG. 5 in the bolded text. Thus, GFSR 510 is able to generate a temporal pattern of "11101110" between states 22 and 31. Using the same seed value of "0000000000000100" and the configuration shown in FIG. 5 for GFSR 510 the same temporal pattern may also be observed within the first 200 states between states 113-117 as well as between states 164-169 (not shown). In a counter mode encryption scheme such as the scheme described and shown for structure 200 in FIG. 2, the version and the higher tree level counters (L0-L2) may all have the same characteristic function and are initiated from the same seed/initial value during enclave operations for the application operating with the TEE. Hence, depending on data/lower level metadata updates, the version and the higher tree level counters traverse through the same sequence of states temporally at different frequencies.

In some examples, dictionary 438 of compression logic 430 may include recurrent temporal patterns generated by an LFSR such as GFSR 510. Dictionary 438 may be able to maintain, for example, 128-256 index entries. Each index entry may have a dictionary index value that, as described more below, may be used in compressing a counter value generated by an LFSR. For example, the above-mentioned pattern of '11101110" may be an entry in dictionary 438 having a dictionary index value that may replace the pattern of "11101110" with the dictionary index value in order to compress the counter value.

Figure 6:
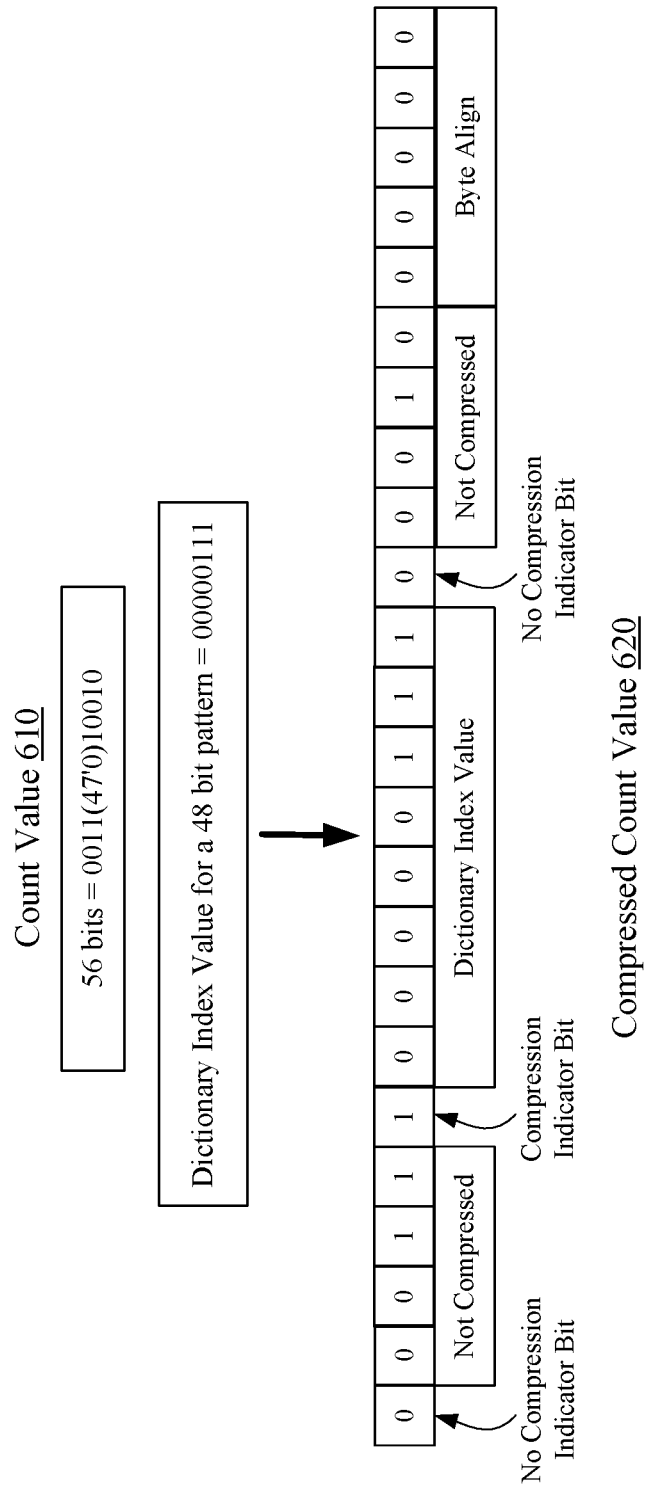
FIG. 6 illustrates an example dictionary scheme.

FIG. 6 illustrates an example dictionary scheme 600. In some examples, dictionary scheme 600 may be based on a 56 bit version counter value that was generated by a 56 bit GFSR with a given configuration (not shown) that was seeded with a known seed value. For these examples, the 56 bit GFSR may generate counter values having temporal patterns. At least a portion of these temporal patterns may be identified and stored to a 256 entry dictionary and assigned a dictionary index value. Although examples are not limited to a 56 bit GFSR or a 256 entry dictionary, GFSRs of greater or lesser bits and dictionaries having more or less entries are contemplated.

According to some examples, as shown in FIG. 6, count value 610 may be a 56 bit count value having a value of 0011(47'0)10010, where (47'0) represents 47 consecutive 0's in the 56 bit count value. In some examples, a pattern that includes (47'0) plus a binary value of 1 may have an assigned dictionary index value of "00000111". For these examples, pattern search feature 432 may have identified this pattern and then accessed dictionary such as dictionary 438 to determine what dictionary index value matched the pattern that includes (47'0)1. Compression logic 410 may then generate a compressed count value 620 that compresses the 56 bit count value down to a 24 bit compressed count value 620. Indicator bits may indicate which portion of count value 610 have not been compressed (indicator bit=0) and which portions have been compressed (indicator bit=1) as shown in FIG. 6. Also, byte align bits may be added to align compressed count values to a 24 bit or 3 byte alignment for eventual storage to MEE cache 117. Examples are not limited to compressed count values compressed to 2-bits. Larger or smaller numbers of bits/bytes are contemplated for a compressed count value.

In some examples, remaining bit positions not compressed via a dictionary scheme may be compressed using another compression scheme such as RLE. Also, for a 56 bit counter value with an initial 8 bits of embedded MAC (not considered for compression), stored pattern lengths in a dictionary such as dictionary 438 may be of 24, 32, 40 or 48 bits with trade-offs between achievable compression ratios and rate of pattern repetition for LFSR counters and hence dictionary fill up (e.g., running out of dictionary index values). A 4 bit level granularity of pattern search with corresponding prefix bits (whether any pattern starts or not at the 4 bit boundary/granularity) may be performed to generated compressed count value 620. Also, tap positions at $33^{rd}$, $34^{th}$ and $55^{th}$ bits in a 56 bit GFSR implementation may enable ample repetition of patterns to be identified and included in a dictionary such as dictionary 438.

Figure 7:
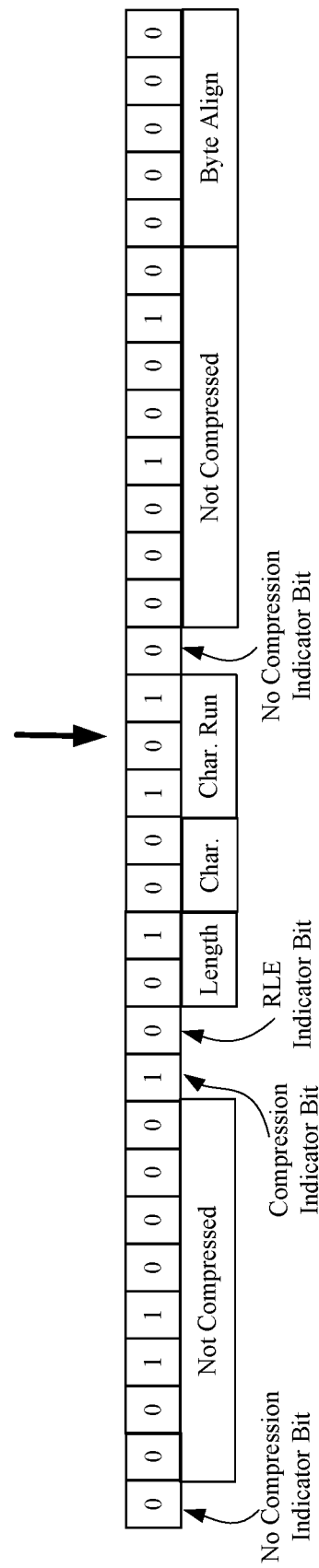
FIG. 7 illustrates an example run length encode scheme.

FIG. 7 illustrates an example RLE scheme 700. In some examples, RLE scheme 700 may be implemented to compress a 56 bit count value. For these examples, count value 710 as shown in FIG. 7 may be the same count value of 0011(47'0)10010 as shown in FIG. 6 for count value 610. However, for RLE scheme 700 rather than a dictionary scheme, an RLE scheme may be used by RLE feature 436 of compression logic 430 to compress a 56 bit count value for count value 710 to generate a compressed 32 bit/4 byte count value for count value 720.

According to some examples, RLE scheme 700 may include a simple run-length encoding scheme, which utilizes spatial runs of a given number of bits such as 0, 1, 01, 01110, etc. and encodes them at either a byte or 4 bit (nibble) run length granularity. For example, a count value such as count value 710 may be searched at each byte/nibble boundary and encoding runs of 1, 2 bytes or 1, 2, 3 or 4 nibbles, etc. as these runs arise. Choosing different run character lengths and run length granularity may lead to varying compression ratios depending on count values.

In some examples, a feature of run length encode feature 436 of compression logic 430 may complete an RLE of count value 710 using a byte granularity and a character run length of 1 bit. As shown in FIG. 7, 5 bytes or 40 bits of the 47 0 bits included in count value 710 may be encoded as shown for compressed count value 720. The "Char. Run" portion of compressed count value 720 indicates the compression of these 40 bits of the 47 0 bits to a binary value of "101". The binary value of "101", based on a byte granularity, indicates 5 bytes or 40 bits. For these examples, the uncompressed 7 bits of the 47 0 bits are included in uncompressed portions of compressed count value 720. Also, 5 0's have been added to byte align compressed count value 720 to 32 bits or 4 bytes of data that are then to be stored to MEE cache 117.

According to some examples, RLE and dictionary schemes may be implemented in tandem. For these examples, a portion of a count value may be encoded based on an identified pattern included in dictionary 438 and another portion of the count value may be encoded using RLE. For these examples, selector feature 434 of compression logic 430 may be capable of selecting one or both of these schemes to compress a count value. Selecting schemes in tandem may save dictionary space by having shorter index values for a smaller number of repeating patterns. Also, in some examples, run lengths for encoding may be extended to include all 8 versions/counters for a counter encryption scheme to increase compression ratios at a cost of possible increases in decompression latency for these longer run lengths.

FIG. 8 illustrates an example storage scheme 800. In some examples, storage scheme 800 includes a tag look up 810. In some examples, an MEE cache such as MEE cache 117 may be arranged as an 8-way associative cache to off-die system memory such as memory 120. For these examples, cache storage management logic for the MEE cache such as cache storage management 410 shown in FIG. 4 may store a compressed counter value (e.g., compressed counter value 620 or compressed counter value 720) by storing the compressed counter value with one or more other compressed counter values in a single way of the 8-way associative cache. Separate tags, status information and compression length indications may be assigned to the compression counter value and the one or more other compressed counter values stored to the single way. The separate tags, status information and compression length indications may be stored to a CAM included in the MEE cache. For these examples, cache storage management logic 410 may be capable of looking up the compressed counter value stored to the MEE cache using its respectively assigned tag. In some examples, the look up may be responsive to a write to a memory location of the off-die system memory associated with that counter value. Decompression logic such as decompression logic 420 of CDE 325 may then decompress the compressed counter value to provide version information for the write to the memory location of the off-die system memory.

In some examples, as shown in FIG. 8, tag look up 810 includes three tags that may utilize storage scheme 800 as mentioned above. For these examples, "[Tag1]" and "[Tag3]" may be tags for compressed counter values as indicated by "[Compressed Len]" included for each of these tags. Tag look up 810 also includes a $3^{rd}$ uncompressed tag at "[Tag2]". All three tags include status information of "[Valid][Dirty]" to indicate data associated with these tags are still valid for use in enclave operations for memory encryption of data cache line writes to off-die system memory. Examples, are not limited to 3 tags for a tag look, any number of tags are contemplated. Also, examples are not limited to an 8-way associative cache for the MEE cache.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 9 illustrates an example of a logic flow 900. Logic flow 900 may be representative of some or all of the operations executed by one or more logic, features, or devices described herein, such as those logic and/or features included in CDE 325. More particularly, logic flow 900 may be implemented by one or more of cache storage management logic 410, de-compression logic 420 or features of compression logic 430.

According to some examples, logic flow 900 at block 902 may receive a cache line to fill the cache included in the on-die memory, the cache line including a counter value generated by a counter (e.g., an LFSR), the counter value to serve as version information during a write to a memory location of an off-die memory. For these examples, compression logic 430 may receive the cache line including the counter value.

In some examples, logic flow 900 at block 904 may compress the counter value based on whether the counter value includes a pattern that matches a given pattern included in a dictionary maintained in the cache and/or based on whether the counter value includes a spatial run of repeated characters or character patterns. For these examples, pattern search feature 432 of compression logic 430 may recognize the given pattern and either RLE feature 436 and/or dictionary 438 may be used to compress the counter value.

According to some examples, logic flow 900 at block 906 may store the compressed counter value to the cache. For these examples, cache management feature 310 may cause the compressed counter value to be stored to the cache (e.g., MEE cache 117).

FIG. 10 illustrates an example storage medium 1000. Storage medium 1000 may include an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
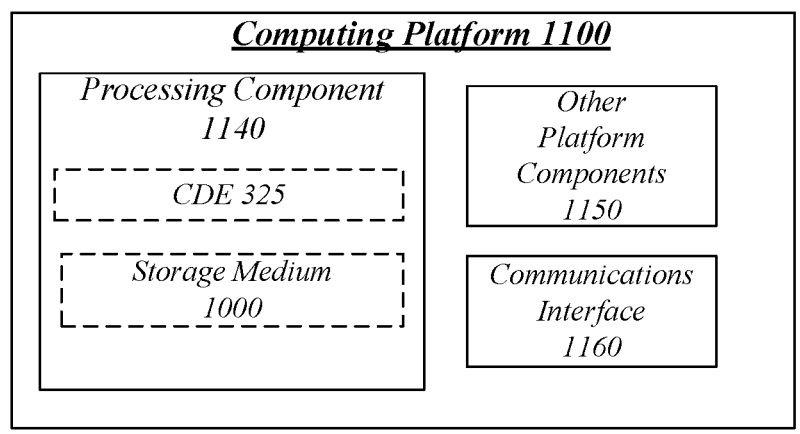
FIG. 11 illustrates an example computing platform.

FIG. 11 illustrates an example computing platform 1100. In some examples, as shown in FIG. 11, computing platform 1100 may include a processing component 1140, other platform components 1150 or a communications interface 1160. According to some examples, computing platform 1100 may host a processor and a memory implementing operations or schemes to compress cryptographic metadata such as system 100 shown in FIG. 1 and system 300 shown in FIG. 3.

According to some examples, processing component 1140 may execute processing operations or logic for CDE 325 and/or storage medium 1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), RAM, DRAM, DDR-RAM), SDRA, SRAM, programmable ROM (PROM), erasable programmable ROM (EPROM), EEPROM, flash memory, polymer memory such as ferroelectric polymer memory, ovonic memory, phase change or ferroelectric memory, SONOS memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3-2012, Carrier sense Multiple access with Collision Detection (CSMA/CD) Access Method and Physical Layer Specifications, Published in December 2012 ("IEEE 802.3"). Network communication may also occur according to one or more OpenFlow specifications such as the OpenFlow Hardware Abstraction API Specification. Network communications may also occur according to Infiniband Architecture specification.

Computing platform 1100 may be part of a computing device that may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1100 described herein, may be included or omitted in various embodiments of computing platform 1100, as suitably desired.

The components and features of computing platform 1100 may be implemented using any combination of discrete circuitry, ASICs, logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic", "feature", "circuit" or "circuitry."

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

EXAMPLE 1

An example apparatus may include a compression-de-compression logic, at least a portion of which is in hardware. The compression-de-compression logic may receive a cache line to fill a cache included in on-die processor memory. The cache may be arranged to store cryptographic metadata. The cache line may include a counter value generated by a counter (e.g., an LFSR), the counter value to serve as version information during a write to a memory location of an off-die memory. The compression-de-compression logic may also compress the counter value based on whether the counter value includes a pattern that matches a given pattern included in a dictionary maintained in the cache and/or based on whether the counter value includes a spatial run of repeated characters or character patterns. The compression-de-compression logic may also store the compressed counter value to the cache.

EXAMPLE 2

The apparatus of example 1, the counter includes a GFSR to generate counter values having temporal patterns, the given pattern included in the dictionary based on a known seed value for the GFSR used to generate the counter values having temporal patterns at least some of the temporal patterns matching the given pattern, the given pattern assigned a dictionary index value.

EXAMPLE 3

The apparatus of example 2, the compression-de-compression logic may also determine that the counter value includes a pattern that matches the given pattern included in the dictionary. The compression-de-compression logic may also compress the counter value via replacement of the pattern included in the counter value with the dictionary index value assigned to the given pattern.

EXAMPLE 4

The apparatus of example 3, the GFSR may be arranged to generate 56 bit counter values with multiple tap positions to cause multiple repeating temporal patterns within counter values generated by the GFSR, at least a portion of the multiple repeating temporal patterns included in the dictionary and having assigned dictionary index values.

EXAMPLE 5

The apparatus of example 1, the compression-de-compression logic may also determine that the counter value includes a spatial run of repeated characters or character patterns. The compression-de-compression logic may also compress the counter value using run length encoding of the repeated characters or character patterns.

EXAMPLE 6

The apparatus of example 5, the spatial run may include repeated characters, the run length encoding based on a character run length of 1, 2 or 4 bits and a 1 byte or 4 bit run length granularity.

EXAMPLE 7

The apparatus of example 1, the cache may be arranged as an 8-way associative cache to the off-die memory. For these examples, the compression-de-compression logic may store the compressed counter value to the cache includes storing the compressed counter value with one or more other compressed counter values in a single way of the 8-way associative cache. The compression-de-compression logic may also assign separate tags, status information and compression length indications to the compressed counter value and the one or more other compressed counter values stored to the single way. The compression-de-compression logic may also store the separate tags, status information and compression length indications to a content addressable memory included in the cache. The compression-de-compression logic may also look up the compressed counter value stored to the cache memory using its respective assigned tag responsive to a write to the memory location of the off-die memory. The compression-de-compression logic may also decompress the compressed counter value to provide version information for the write to the memory location of the off-die memory.

EXAMPLE 8

The apparatus of example 7, the 8-way associated cache may be included in on-die processor memory that includes SRAM and the off-die memory comprises at least one of a volatile type of memory that includes DRAM or a non-volatile type of memory that includes 3-dimensional cross-point memory, memory that uses chalcogenide phase change material, ferroelectric memory, SONOS memory, polymer memory, ferroelectric polymer memory, FeTRAM, FeRAM, ovonic memory, nanowire, memristors or STT-MRAM.

EXAMPLE 9

The apparatus of example 1, the compression-de-compression logic may also implement a cache replacement policy that includes a compression aware LRU scheme. For these examples, the compression aware LRU scheme may select counter values stored to the cache for replacement or eviction based, at least in part, on whether a selected counter value has been compressed and an amount of time the selected counter value has been stored to the cache.

EXAMPLE 10

The apparatus of example 1, the cache arranged to store the cryptographic metadata may be for a memory encryption engine associated with a TEE, SGX providing cryptographic mechanisms for encryption, integrity, and replay protection for an application executing within the TEE.

EXAMPLE 11

An example method may include receiving, at a processor circuit, a cache line to fill a cache included in on-die processor memory. The cache may be arranged to store cryptographic metadata. The cache line may include a counter value generated by a counter (e.g., an LFSR). The counter value may serve as version information during a write to a memory location of an off-die memory. The method may also include compressing the counter value based on whether the counter value includes a pattern that matches a given pattern included in a dictionary maintained in the cache and/or based on whether the counter value includes a spatial run of repeated characters or character patterns. The method may also include storing the compressed counter value to the cache.

EXAMPLE 12

The method of example 11, the counter may be a GFSR to generate counter values having temporal patterns. The given pattern may be included in the dictionary based on a known seed value for the GFSR used to generate the counter values having temporal patterns at least some of the temporal patterns matching the given pattern, the given pattern assigned a dictionary index value.

EXAMPLE 13

The method of example 12 may also include determining that the counter value includes a pattern that matches the given pattern included in the dictionary. The method may also include compressing the counter value by replacing the pattern included in the counter value with the dictionary index value assigned to the given pattern.

EXAMPLE 14

The method of example 13, the GFSR may be arranged to generate 56 bit counter values with multiple tap positions to cause multiple repeating temporal patterns within counter values generated by the GFSR, at least a portion of the multiple repeating temporal patterns included in the dictionary and having assigned dictionary index values.

EXAMPLE 15

The method of example 11 may also include determining that the counter value includes a spatial run of repeated characters or character patterns. The method may also include compressing the counter value using run length encoding of the repeated characters or character patterns.

EXAMPLE 16

The method of example 15, the spatial run may include repeated characters, the run length encoding based on a character run length of 1, 2 or 4 bits and a 1 byte or 4 bit run length granularity.

EXAMPLE 17

The method of example 11, the cache may be arranged as an 8-way associative cache to the off-die memory. For these examples, the method may also include storing the compressed counter value to the cache includes storing the compressed counter value with one or more other compressed counter values in a single way of the 8-way associative cache. The method may also include assigning separate tags, status information and compression length indications to the compressed counter value and the one or more other compressed counter values stored to the single way. The method may also include storing the separate tags, status information and compression length indications to a content addressable memory included in the cache. The method may also include looking up the compressed counter value stored to the cache memory using its respective assigned tag responsive to a write to the memory location of the off-die memory. The method may also include decompressing the compressed counter value to provide version information for the write to the memory location of the off-die memory.

EXAMPLE 18

The method of example 17, the 8-way associated cache may be included in on-die processor memory that comprises SRAM and the off-die memory comprises at least one of a volatile type of memory that includes DRAM or a non-volatile type of memory that includes 3-dimensional cross-point memory, memory that uses chalcogenide phase change material, ferroelectric memory, SONOS memory, polymer memory, ferroelectric polymer memory, FeTRAM, FeRAM, ovonic memory, nanowire, memristors or STT-MRAM.

EXAMPLE 19

The method of example 11 may also include implementing a cache replacement policy that includes a compression aware LRU scheme. For these examples, the compression aware LRU scheme may select counter values stored to the cache for replacement or eviction based, at least in part, on whether a selected counter value has been compressed and an amount of time the selected counter value has been stored to the cache.

EXAMPLE 20

The method of example 11, the cache may be arranged to store the cryptographic metadata is for a memory encryption engine associated with a TEE, SGX providing cryptographic mechanisms for encryption, integrity, and replay protection for an application executing within the TEE.

EXAMPLE 21

An example at least one machine readable medium may include a plurality of instructions that in response to being executed by system at a storage device may cause the system to carry out a method according to any one of examples 11 to 20.

EXAMPLE 22

An apparatus may include means for performing the methods of any one of examples 11 to 10.

EXAMPLE 23

An example system may include one or more processing elements resident on a die. The system may also include on-die memory for the one or more processing elements. The on-die memory may include a cache arranged to store cryptographic metadata. The system may also include a compression-de-compression logic, at least a portion of which is in hardware. The compression-de-compression logic may receive a cache line to fill the cache included in the on-die memory, the cache line including a counter value generated by a counter (e.g., an LFSR). The counter value may serve as version information during a write to a memory location of an off-die memory. The compression-de-compression logic may also compress the counter value based on whether the counter value includes a pattern that matches a given pattern included in a dictionary maintained in the cache and/or based on whether the counter value includes a spatial run of repeated characters or character patterns. The compression-de-compression logic may also store the compressed counter value to the cache.

EXAMPLE 24

The system of example 23, the counter may be a GFSR to generate counter values having temporal patterns. For these examples, the given pattern may be included in the dictionary based on a known seed value for the GFSR used to generate the counter values having temporal patterns at least some of the temporal patterns matching the given pattern, the given pattern assigned a dictionary index value.

EXAMPLE 25

The system of example 24, the compression-de-compression logic may also determine that the counter value includes a pattern that matches the given pattern included in the dictionary. The compression-de-compression logic may also compress the counter value via replacement of the pattern included in the counter value with the dictionary index value assigned to the given pattern.

EXAMPLE 26

The system of example 25, the GFSR may be arranged to generate 56 bit counter values with multiple tap positions to cause multiple repeating temporal patterns within counter values generated by the GFSR. For these examples, at least a portion of the multiple repeating temporal patterns may be included in the dictionary and may have assigned dictionary index values.

EXAMPLE 27

The system of example 23, the compression-de-compression logic may also determine that the counter value includes a spatial run of repeated characters or character patterns. The compression-de-compression logic may also compress the counter value using run length encoding of the repeated characters or character patterns.

EXAMPLE 28

The system of example 27, the spatial run may include repeated characters, the run length encoding based on a character run length of 1, 2 or 4 bits and a 1 byte or 4 bit run length granularity.

EXAMPLE 29

The system of example 23, the cache may be arranged as an 8-way associative cache to the off-die memory. For these examples, the compression-de-compression logic may store the compressed counter value to the cache includes storing the compressed counter value with one or more other compressed counter values in a single way of the 8-way associative cache. The compression-de-compression logic may also assign separate tags, status information and compression length indications to the compressed counter value and the one or more other compressed counter values stored to the single way. The compression-de-compression logic may also store the separate tags, status information and compression length indications to a content addressable memory included in the cache. The compression-de-compression logic may also look up the compressed counter value stored to the cache memory using its respective assigned tag responsive to a write to the memory location of the off-die memory. The compression-de-compression logic may also decompress the compressed counter value to provide version information during the write to the memory location of the off-die processor memory.

EXAMPLE 30

The system of example 29, the 8-way associated cache may be included in on-die processor memory that includes SRAM and the off-die memory may include at least one of a volatile type of memory that includes DRAM or a non-volatile type of memory that includes 3-dimensional cross-point memory, memory that uses chalcogenide phase change material, ferroelectric memory, SONOS memory, polymer memory, ferroelectric polymer memory, FeTRAM, FeRAM, ovonic memory, nanowire, memristors or STT-MRAM.

EXAMPLE 31

The system of example 23, the compression-de-compression logic may also implement a cache replacement policy that includes a compression aware LRU scheme. For these examples, the compression aware LRU scheme may select counter values stored to the cache for replacement or eviction based, at least in part, on whether a selected counter value has been compressed and an amount of time the selected counter value has been stored to the cache.

EXAMPLE 32

The system of example 23, the cache arranged to store the cryptographic metadata may be for a memory encryption engine associated with a TEE, SGX providing cryptographic mechanisms for encryption, integrity, and replay protection for an application executing within the TEE.

EXAMPLE 33

The system of example 23 may also include a display communicatively coupled to the one or more processing elements. The system may also include a network interface communicatively coupled to the one or more processing elements. The system may also include a battery communicatively coupled to the one or more processing elements.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    an on-die processor memory; and
    a compression-de-compression logic, at least a portion of which is in hardware, the compression-de-compression logic to:
    receive a cache line to fill a cache included in the on-die processor memory, the cache arranged to store cryptographic metadata, the cache line including a counter value generated by a counter that generates counter values having temporal patterns, the counter value to serve as cache line version information during a write to a memory location of an off-die memory;
    compress the counter value based on whether the counter value includes a pattern that matches a given pattern included in a dictionary maintained in the cache and/or based on whether the counter value includes a spatial run of repeated characters or character patterns; and
    store the compressed counter value to the cache.

2. The apparatus of claim 1, the counter that generates the counter values having temporal patterns comprising a Galois field shift register (GFSR), the given pattern included in the dictionary based on a known seed value for the GFSR used to generate the counter values having temporal patterns, at least some of the temporal patterns matching the given pattern, the given pattern assigned a dictionary index value.

3. The apparatus of claim 2, comprising the compression-de-compression logic to:
    determine that the counter value includes a pattern that matches the given pattern included in the dictionary; and
    compress the counter value via replacement of the pattern included in the counter value with the dictionary index value assigned to the given pattern.

4. The apparatus of claim 3, comprising the GFSR arranged to generate 56 bit counter values with multiple tap positions to cause multiple repeating temporal patterns within counter values generated by the GFSR, at least a portion of the multiple repeating temporal patterns included in the dictionary and having assigned dictionary index values.

5. The apparatus of claim 1, comprising the compression-de-compression logic to:
    determine that the counter value includes a spatial run of repeated characters or character patterns; and
    compress the counter value using run length encoding of the repeated characters or character patterns.

6. The apparatus of claim 5, the spatial run comprises repeated characters, the run length encoding based on a character run length of 1, 2 or 4 bits and a 1 byte or 4 bit run length granularity.

7. The apparatus of claim 1, the cache arranged as an 8-way associative cache in the off-die memory, the compression-de-compression logic to:
    store the compressed counter value to the cache includes storing the compressed counter value with one or more other compressed counter values in a single way of the 8-way associative cache;
    assign separate tags, status information and compression length indications to the compressed counter value and the one or more other compressed counter values stored to the single way;
    store the separate tags, status information and compression length indications to a content addressable memory included in the cache;
    look up the compressed counter value stored to the cache memory using its respective assigned tag responsive to a write to the memory location of the off-die memory; and
    decompress the compressed counter value to provide version information for the write to the memory location of the off-die memory.

8. The apparatus of claim 7, the 8-way associated cache included in on-die processor memory that comprises static random access memory (SRAM) and the off-die memory comprises at least one of a volatile type of memory that includes dynamic random access memory (DRAM) or a non-volatile type of memory that includes 3-dimensional cross-point memory, memory that uses chalcogenide phase change material, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, memristors or spin transfer torque-magnetoresistive random access memory (STT-MRAM).

9. The apparatus of claim 1, comprising the compression-de-compression logic to:
    implement a cache replacement policy that includes a compression aware last recently used (LRU) scheme, the compression aware LRU scheme selecting counter values stored to the cache for replacement or eviction based, at least in part, on whether a selected counter value has been compressed and an amount of time the selected counter value has been stored to the cache.

10. The apparatus of claim 1, the cache arranged to store the cryptographic metadata is for a memory encryption engine associated with a trusted execution environment (TEE), software guard extensions (SGX) providing cryptographic mechanisms for encryption, integrity, and replay protection for an application executing within the TEE.

11. A method comprising:
by a compression-de-compression logic:
receiving a cache line to fill a cache included in on-die processor memory, the cache arranged to store cryptographic metadata, the cache line including a counter value generated by a counter that generates counter values having temporal patterns, the counter value to serve as cache line version information during a write to a memory location of an off-die memory;
compressing the counter value based on whether the counter value includes a pattern that matches a given pattern included in a dictionary maintained in the cache and/or based on whether the counter value includes a spatial run of repeated characters or character patterns; and
storing the compressed counter value to the cache.

12. The method of claim 11, the counter that generates the counter values having temporal patterns comprising a Galois field shift register (GFSR), the given pattern included in the dictionary based on a known seed value for the GFSR used to generate the counter values having temporal patterns, at least some of the temporal patterns matching the given pattern, the given pattern assigned a dictionary index value.

13. The method of claim 12, comprising:
determining that the counter value includes a pattern that matches the given pattern included in the dictionary; and
compressing the counter value by replacing the pattern included in the counter value with the dictionary index value assigned to the given pattern.

14. The method of claim 11, comprising:
determining that the counter value includes a spatial run of repeated characters or character patterns; and
compressing the counter value using run length encoding of the repeated characters or character patterns.

15. The method of claim 11, comprising:
the cache arranged as an 8-way associative cache in the off-die memory;
storing the compressed counter value to the cache includes storing the compressed counter value with one or more other compressed counter values in a single way of the 8-way associative cache;
assigning separate tags, status information and compression length indications to the compressed counter value and the one or more other compressed counter values stored to the single way;
storing the separate tags, status information and compression length indications to a content addressable memory included in the cache;
looking up the compressed counter value stored to the cache memory using its respective assigned tag responsive to a write to the memory location of the off-die memory; and
decompressing the compressed counter value to provide version information for the write to the memory location of the off-die memory.

16. The method of claim 11, comprising:
implementing a cache replacement policy that includes a compression aware last recently used (LRU) scheme, the compression aware LRU scheme selecting counter values stored to the cache for replacement or eviction based, at least in part, on whether a selected counter value has been compressed and an amount of time the selected counter value has been stored to the cache.

17. The method of claim 11, the cache arranged to store the cryptographic metadata is for a memory encryption engine associated with a trusted execution environment (TEE), software guard extensions (SGX) providing cryptographic mechanisms for encryption, integrity, and replay protection for an application executing within the TEE.

18. A system comprising:
one or more processing elements resident on a die;
on-die memory for the one or more processing elements, the on-die memory including a cache arranged to store cryptographic metadata; and
a compression-de-compression logic, at least a portion of which is in hardware, the compression-de-compression logic to:
receive a cache line to fill the cache included in the on-die memory, the cache line including a counter value generated by a counter that generates counter values having temporal patterns, the counter value to serve as cache line version information during a write to a memory location of an off-die memory;
compress the counter value based on whether the counter value includes a pattern that matches a given pattern included in a dictionary maintained in the cache and/or based on whether the counter value includes a spatial run of repeated characters or character patterns; and
store the compressed counter value to the cache.

19. The system of claim 18, the counter that generates the counter values having temporal patterns comprising a Galois field shift register (GFSR), the given pattern included in the dictionary based on a known seed value for the GFSR used to generate the counter values having temporal patterns, at least some of the temporal patterns matching the given pattern, the given pattern assigned a dictionary index value.

20. The system of claim 19, comprising the compression-de-compression logic to:
determine that the counter value includes a pattern that matches the given pattern included in the dictionary; and
compress the counter value via replacement of the pattern included in the counter value with the dictionary index value assigned to the given pattern.

21. The system of claim 18, comprising the compression-de-compression logic to:
determine that the counter value includes a spatial run of repeated characters or character patterns; and
compress the counter value using run length encoding of the repeated characters or character patterns.

22. The system of claim 18, the cache arranged as an 8-way associative cache in the off-die memory, the compression-de-compression logic to:
store the compressed counter value to the cache includes storing the compressed counter value with one or more other compressed counter values in a single way of the 8-way associative cache;
assign separate tags, status information and compression length indications to the compressed counter value and the one or more other compressed counter values stored to the single way;
store the separate tags, status information and compression length indications to a content addressable memory included in the cache;
look up the compressed counter value stored to the cache memory using its respective assigned tag responsive to a write to the memory location of the off-die memory; and
decompress the compressed counter value to provide version information during the write to the memory location of the off-die memory.

23. The system of claim 22, the 8-way associated cache included in the on-die memory, the on-die memory comprises static random access memory (SRAM) and the off-die memory comprises at least one of a volatile type of memory that includes dynamic random access memory (DRAM) or a non-volatile type of memory that includes 3-dimensional cross-point memory, memory that uses chalcogenide phase change material, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, memristors or spin transfer torque-magnetoresistive random access memory (STT-MRAM).

24. The system of claim 18, comprising the compression-de-compression logic to:
  implement a cache replacement policy that includes a compression aware last recently used (LRU) scheme, the compression aware LRU scheme selecting counter values stored to the cache for replacement or eviction based, at least in part, on whether a selected counter value has been compressed and an amount of time the selected counter value has been stored to the cache.

25. The system of claim 18, the cache arranged to store the cryptographic metadata is for a memory encryption engine associated with a trusted execution environment (TEE), software guard extensions (SGX) providing cryptographic mechanisms for encryption, integrity, and replay protection for an application executing within the TEE.

26. The system of claim 18, comprising:
  a display communicatively coupled to the one or more processing elements;
  a network interface communicatively coupled to the one or more processing elements; or
  a battery communicatively coupled to the one or more processing elements.

* * * * *